United States Patent [19]

Malm

[11] 4,247,943

[45] Jan. 27, 1981

[54] PIECEWISE COHERENT, COMBINED FREQUENCY AND PHASE-SHIFT-KEYED SIGNAL DEMODULATOR

[75] Inventor: Robert Malm, Pacific Palisades, Calif.

[73] Assignee: Northrop Corporation, Los Angeles, Calif.

[21] Appl. No.: 41,053

[22] Filed: May 21, 1979

[51] Int. Cl.³ .................................... H03K 9/10
[52] U.S. Cl. .................... 375/79; 364/484; 375/82; 375/91; 370/12
[58] Field of Search ............. 179/15 BC; 178/66 R, 178/88; 325/320; 329/110, 112, 124, 122, 153, 154, 50; 340/171 R, 207 R, 207 P, 170; 364/484, 701, 702, 703, 117, 480; 375/53, 54, 80, 81, 82, 83, 86, 90, 97, 79, 46, 91; 455/255, 258, 260; 331/1 A, 1 R, 25; 370/19, 20

[56] References Cited

U.S. PATENT DOCUMENTS

| | | | |
|---|---|---|---|
| B498,775 | 3/1976 | Balcewicz | 325/320 |
| 3,800,227 | 3/1974 | Kobayashi et al. | 178/88 |
| 3,855,533 | 12/1974 | Schüeli | 370/20 |
| 3,875,394 | 4/1975 | Shapely | 179/15 BC |
| 4,174,489 | 11/1979 | Guidoax et al. | 364/702 |
| 4,178,631 | 12/1979 | Nelson, Jr. | 364/484 |

*Primary Examiner*—Benedict V. Safourek
*Attorney, Agent, or Firm*—Edward A. Sokolski

[57] ABSTRACT

A system for demodulating piecewise coherent, combined frequency and phase-shift-keyed signals that are modulateed by orthogonal or biorthogonal code words. Rather than maintain local reference signals in phase-lock with the received signal, the system mixes the received signal with both sine and cosine signals at both the mark and the space frequencies to obtain multiple outputs which are correlated with each of the code words utilized by the system to determine the particular code words that have been received.

4 Claims, 1 Drawing Figure

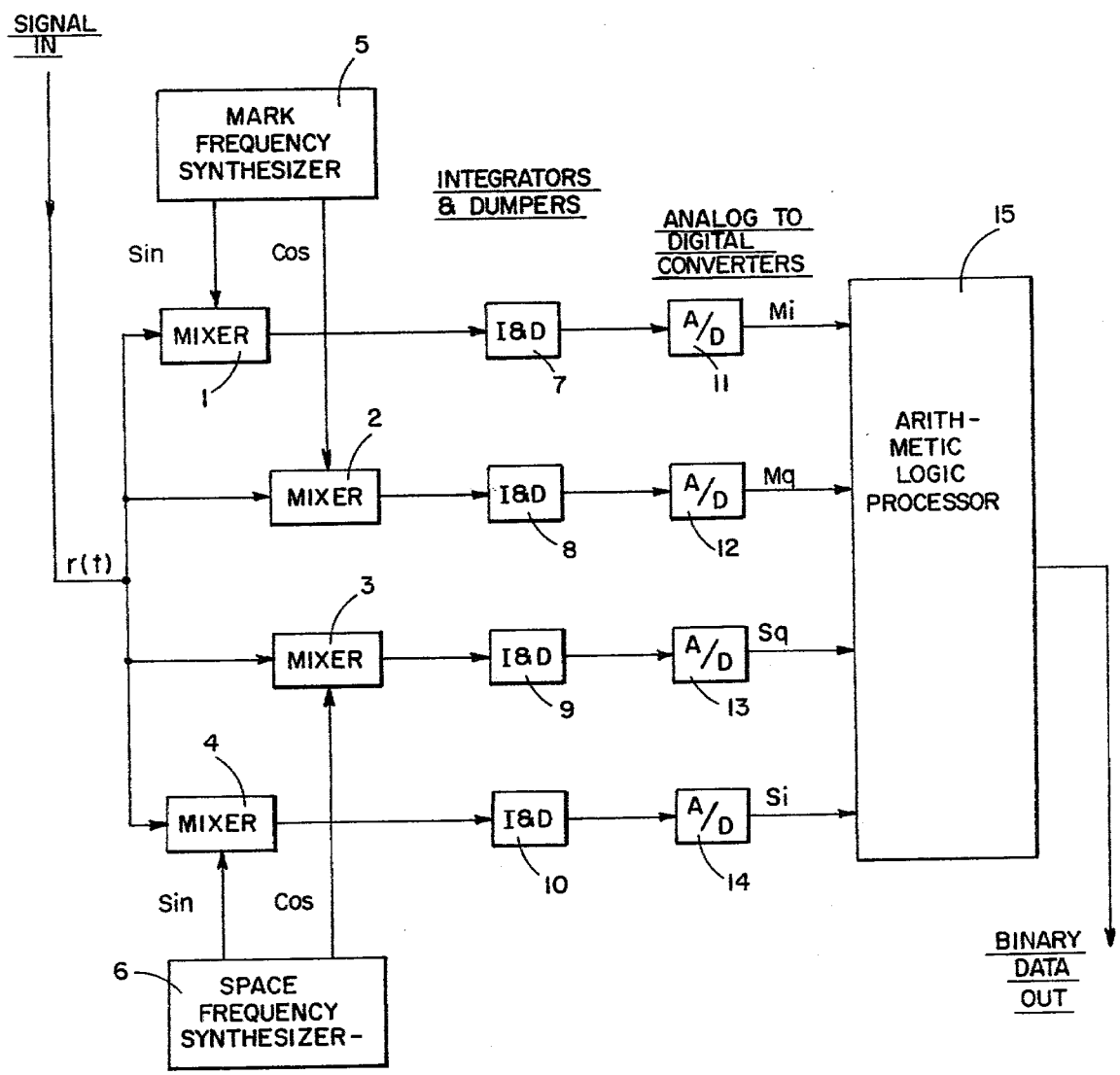

PIECEWISE COHERENT, COMBINED FREQUENCY AND PHASE-SHIFT-KEYED SIGNAL DEMODULATOR

BACKGROUND OF THE INVENTION

1. Field of the Invention

The system of this invention relates to the demodulation of piecewise coherent, combined frequency and phase-shift-keyed signals. More particularly, this system applies to the demodulation of such signals that are modulated by orthogonal or bi-orthogonal codes. Examples of orthogonal codes used to modulate such signals are described in "Codes with Special Correlation" by Leonard Baumert which appears as Chapter 4 in "Digital Communication with Space Applications" edited by Soloman Golomb, Prentice-Hall, Englewood Cliffs, N.J. (1964).

2. Description of the Prior Art

Prior art systems exist for the demodulation of coherent, phase-shift-keyed signals. However, in some applications, such as in "frequency-hopping" communication systems, the received signals do not exhibit phase coherence over long intervals. In frequency-hopping systems, the transmission frequency is changed abruptly a number of times during transmission. Typically, the changes in frequency are a great many times greater than that normally associated with frequency shift keying. Because of the large changes in frequency, and the variations of propagation conditions with frequency, phase-coherence between the different transmission frequencies, typically does not obtain. However, the received signal normally still exhibits phase-coherence during the interval of transmission on a single frequency. The period of transmission at a single frequency, normally is sufficiently long to include the transmission of one, and typically a number, of code words. U.S. patent application Ser. No. 4,485, filed Jan. 8, 1979, for the invention "IN-PHASE QUADRATURE DEMODULATOR FOR CPSK SIGNALS" describes a system for demodulating such frequency-hopped signals where phase coherence is maintained only for the short intervals containing one or more code words of transmitted data. A system also has been developed for the modulation and demodulation of signals by a combination of frequency and phase-shift-keying. Such a combined system is described in U.S. patent application Ser. No. 880,631, filed Feb. 23, 1978, now abandoned and replaced by continuation-in-part Ser. No. 50,795, filed June 21, 1979. The system of the invention described in the present application is an adaptation of the "in-phase quadrature" demodulation technique for use in the demodulation of combined, frequency and phase-shift-keyed signals which exhibit piecewise phase coherence over the intervals occupied by one or more code words, but which may lack phase coherence between the portions of the signal received at different frequencies because of frequency hopping.

SUMMARY OF THE INVENTION

In the system of this invention, the locally generated mark and space reference frequencies are not locked in phase with the received signal. Nevertheless, by mixing the received signal with sine and cosine signals at both the mark and space frequencies, and by correlating the outputs of these mixers with each of the code words utilized in the communication system, the system of this invention identifies each code word as it is received. Because the received signal exhibits phase coherence during the interval occupied by a single code word and because the sine and cosine signals generated by the mark and space frequency synthesizers are in phase quadrature, the output from one or the other of the mixers operating at the mark frequency and from one or the other of the mixers operating at the space frequency will be significant and will exhibit the characteristics of the code word, which then can be identified.

BRIEF DESCRIPTION OF THE DRAWINGS

FIG. 1 is a block diagram of the invention.

DESCRIPTION OF THE PREFERRED EMBODIMENT

The properties of, and means for generating and demodulating, a frequency and phase-shift-keyed signal are described in U.S. patent application Ser. No. 880,631, filed Feb. 23, 1978, now abandoned and replaced by continuation-in-part Ser. No. 50,795, filed June 21, 1979. The signal that is demodulated by this invention is such a combined frequency and phase-shift-keyed signal, but one for which phase coherence in some operational circumstances may exist only over relatively short intervals that include only a few code words.

Referring now to FIG. 1, the signal r(t) to be demodulated, having been translated from the transmission frequency to a suitable intermediate frequency, enters mixers 1, 2, 3 and 4, where it is mixed respectively with a sine and a cosine signal at the mark frequency of the received signal that have been generated by mark-frequency synthesizer 5, and with a cosine and a sine signal that have been generated by space-frequency synthesizer 6 at the space frequency of the received signal. The outputs of mixers 1, 2, 3 and 4 enter respectively integrator and dumpers 7, 8, 9 and 10, which integrate the outputs of the respective mixers and dump the outputs of the integration at the end of each keying interval into analog to digital converters 11, 12, 13 and 14, which, in turn, convert the analog outputs of the integrator and dumpers 7 through 10 into digital data. The digital outputs of analog to digital converters 11 through 14 are input to arithmetic logic processor 15 which compares these outputs with the different code words used by the system to determine which code word has been received during the period of time occupied by each code word and then outputs the corresponding binary data as the demodulated signal.

The operation of the arithmetic logic processor and its mechanization are described most simply by means of the following equations and explanatory comments. The operation of mixers, and of the integrators and dumpers has been described in some detail in U.S. patent application Ser. No. 1,485 by means of equations numbered 4, 5 and 6 in that application. The four mixers and integrators and dumpers in the present invention operate in a manner similar to that described in U.S. patent application Ser. No. 1,485 and are described by the following equations:

$$d_{si}(j,n) = \frac{2}{A(t)T} \int r(t) \sin 2\pi f_s t \, dt \quad (1)$$

$n$'th bit
$j$'th code word

-continued $$d_{sq}(j,n) = \frac{2}{A(t)T} \int_{\substack{n\text{'th bit} \\ j\text{'th code word}}} r(t) \cos 2\pi f_s t \, dt \qquad (2)$$

$$d_{mi}(j,n) = \frac{2}{A(t)T} \int_{\substack{n\text{'th bit} \\ j\text{'th code word}}} r(t) \sin 2\pi f_m t \, dt \qquad (3)$$

$$d_{mq}(j,n) = \frac{2}{A(t)T} \int_{\substack{n\text{'th bit} \\ j\text{'th code word}}} r(t) \cos 2\pi f_m t \, dt \qquad (4)$$

$d_{mi}$ represents the output of the integrator and dumper 7, which is the integral of the product of the signal to be demodulated and the sine wave generated at the mark frequency by mark-frequency synthesizer 5; $d_{mq}$ is the output of integrator and dumper 8 corresponding to the integral of the product of the cosine signal generated at the mark frequency, $f_m$, and the signal to be demodulated; $d_{sq}$ is the output of integrator and dumper 9 corresponding to the integral of the product of the signal to be demodulated and the cosine signal generated by the space-frequency synthesizer; and $d_{si}$ represents the output of integrator and dumper 10 corresponding to the integral of the product of the sine wave at the space frequency, $f_s$, generated by the space-frequency synthesizer 6 and the signal to be demodulated. $A(t)$ is the amplitude of the received signal and T is the bit duration. The factor $2/A(t)T$ in equations (1), (2), (3), and (4) represents the effect of automatic gain control of the receiver front end.

After being converted into digital form by the analog to digital converts 11 through 14, the outputs of the integrator and dumpers 7 through 10 are processed by the arithmetic logic processor 15 in accord with the following equations:

$$\left.\begin{array}{l}C_i(j,m) = \underset{n}{\Sigma} \, [1 - 2W(m,n)] \, [d_{mi}(j,n) + d_{si}(j,n)] \quad (5a) \\ C_q(j,m) = \underset{n}{\Sigma} \, [1 - 2W(m,n)] \, [d_{mq}(j,n) + d_{sq}(j,n)] \quad (5b)\end{array}\right\} P(j-\delta) = 1$$

$$\left.\begin{array}{l}C_i(j,m) = \underset{n}{\Sigma} \, [1 - 2W(m,n)] \, \{D_r(j-\delta,n) \cdot d_{mi}(j,n) \quad (6a) \\ \quad + \overline{D_r}(j-\delta,n) \cdot d_{si}(j,n)\} \\ C_q(j,m) = \underset{n}{\Sigma} \, [1 - 2W(m,n)] \, \{D_r(j-\delta,n) \cdot d_{mq}(j,n) \\ \quad + \overline{D_r}(j-\delta,n) \cdot d_{sq}(j,n)\} \quad (6b)\end{array}\right\} P(j-\delta) = 0$$

$W(m,n)$ is the n'th binary digit (0 or 1) in the m'th code word used in the system of modulation. The summations in Equations 5 and 6 are performed over the n bits in one code word. "j" represents the "j'th" period of time, during which a single code word is received. The values of $C_i$ and $C_q$ are calculated for each of the values of m corresponding to each of the different code words. The manner in which the Arithmetic Logic Processor 15 operates to demodulate the received signal which consists of either orthogonal or bi-orthogonal code words is referred to herein as "the piecewise coherent, combined frequency and phase-shift-keyed signal demodulation technique."

In a manner similar to that utilized by the in-phase quadrature demodulator, described in U.S. patent application Ser. No. 1,485, the arithmetic logic processor 15 examines, for the "j'th" code period, the absolute values of $C_i(j,m)$ and $C_q(j,m)$ to find for which value of m, the $C_i$ or $C_q$ is the largest and then outputs the code word corresponding to that value of m as being the code word that was received during the j'th code period. Equations 5a and 5b describe the initial operation of the processor when no previous code words have been received or when the error predictor, $P(j-\delta)$, described below, indicates that the determination of the previously received code words by the processor is unreliable, i.e., when $P(j-\delta)=1$. When the processor has demodulated the code word which was received $\delta$ intervals previously, and the error predictor described below indicates that such demodulation was probably accurate (i.e., $P(j-\delta)=0$), the processor operates in the manner described by Equations 6a and 6b. $D_r(j-\delta,n)$ represents the n'th bit (0 or 1) of the j'th code word received $\delta$ code words previously and $\delta$ is the delay between the frequency and the phase shift keying as described in U.S. patent application Ser. No. 880,631, filed Feb. 23, 1978. $\overline{D_r}$ is the complement of $D_r$. As illustrated by Equations 6a and 6b, when the previous code words are known, the processor uses this knowledge of the manner in which the received signal will shift between the mark and the space frequencies to improve the demodulation process. In order that $d_{mi}$ and $d_{si}$ add constructively, and $d_{mq}$ and $d_{sq}$ add constructively, when combined in Equations 6a and 6b, even though the actual phases of the mark and space frequency synthesizers 5 and 6 are not locked onto the phases of the received signal, the product of the difference between the mark and space frequencies in the transmitted signal and the frequency keying period is chosen to be an integral number of cycles.

Processor 15 examines the absolute values of $C_i$ and $C_q$ given by Equations 6a and 6b to determine the value of m for which the absolute value of $C_i$ or $C_q$ is the largest and then outputs the code word corresponding to this value of m as the demodulated output of the system.

In a manner similar to that described in my U.S. patent application Ser. No. 001,485, filed Jan. 8, 1979, a type-1 error predictor, $P_1(j)$, is defined by the following equation:

$$P_1(j) = \begin{array}{l} 0 \, ; \, C(j,M) \geq \Delta \cdot R \\ 1 \, ; \, C(j,M) < \Delta \cdot R \end{array} \qquad (7)$$

Similarly, a type-2 error predictor, $P_2(j)$, is described by the following equation:

$$P_2(j) = \begin{array}{l} 0 \, ; \, C(j,M) - C(j,L) \geq \Delta \cdot R \\ 1 \, ; \, C(j,M) - C(j,L) < \Delta \cdot R \end{array} \qquad (8)$$

either of which is implemented by the processor. $C(j,M)$ represents the largest of the absolute values of $C_i$ and $C_q$; $C(j,L)$ represents the next largest; $\Delta$ is a parameter selected to maximize performance and R is a reference which may be set to 1 if the error predictor is "signal-referenced" or to $1/(S/N)$ if the error predictor is "noise-referenced." S/N represents the signal-to-noise ratio of the received signal. For operation in circumstances where the receiver automatic gain control is maintaining the received signal at the demodulator input at a reasonably constant level. The signal-to-noise ratio is obtained from a measurement of the power received in the band containing the signal plus noise and the power received in an adjacent band which contains only noise and calculating the signal-to-noise ratio based on these measurements.

Values of $\Delta$ of the order of 2 or 3 are suitable for the operation of this invention.

Biorthogonal codes also may be used in the practice of this invention. For demodulating biorthogonal codes, the arithmetic logic processor 15 operates in the manner described by the following equations:

$$\left.\begin{aligned}
C_i(j,m) &= \sum_n [1 - 2W(m,n)]\{D_e(j - \delta,n) \cdot d_{mi}(j,n) + \overline{D_e}(j - \delta,n) \cdot d_{si}(j,n)\} \\
C_i^+(j,m) &= \sum_n [1 - 2W(m,n)]\{\overline{D_e}(j - \delta,n) \cdot d_{mi}(j,n) + D_e(j - \delta,n) \cdot d_{si}(j,n)\} \\
C_q(j,m) &= \sum_n [1 - 2W(m,n)]\{D_e(j - \delta,n) \cdot d_{mq}(j,n) + \overline{D_e}(j - \delta,n) \cdot d_{sq}(j,n)\} \\
C_q^+(j,m) &= \sum_n [1 - 2W(m,n)]\{\overline{D_e}(j - \delta,n) \cdot d_{mq}(j,n) + D_e(j - \delta,n) \cdot d_{sq}(j,n)\}
\end{aligned}\right\} \quad (9)$$

A received data word $D_e(j,n)$ is identified tentatively in the following manner: $C(j,M)$ denotes the largest of $|C_i(j,m)|$, $|C_i^+(j,m)|$, $|C_q(j,m)|$ and $|C_q^+(j,m)|$. Then $$D_e(j,n) = W(M',n) \quad (10)$$

where $M'$ is equal to $M$ modulo $2^{k-1}$. In this system, a code is used for which the complement of the m'th code (where $m$ is less than $2^{k-1}$) is the $(2^{k-1}+m)$'th code. When the frequency keyed data becomes available $\delta$ code words later, the received data word $D_r(j-\delta, n)$ is then identified by means of the equation:

$$D_r(j-\delta,n) = \begin{cases} D_e(j-\delta,n); C(j,M) = \begin{cases} C_i(j,M) \\ \text{or} \\ C_q(j,M) \end{cases} \\ \overline{D_e}(j-\delta,n); C(j,M) = \begin{cases} C_i^+(j,M) \\ \text{or} \\ C_q^+(j,M) \end{cases} \end{cases} \quad (11)$$

I claim:
1. A system for obtaining a demodulated signal from a piecewise coherent, combined frequency and phase-shift-keyed signal modulated by code words selected from a predetermined set of such code words comprising:
   a. mark-frequency synthesizer means for synthesizing a sine and a cosine signal at the mark frequency of the signal to be demodulated,
   b. space-frequency synthesizer means for generating a sine and a cosine signal at the space frequency of the signal to be demodulated,
   c. a first mixer which mixes the signal to be demodulated with the sine wave from the mark-frequency synthesizer means,
   d. a second mixer which mixes the signal to be demodulated with the cosine signal from the mark-frequency synthesizer means,
   e. a third mixer which mixes the signal to be demodulated with the cosine signal from the space frequency synthesizer means,
   f. a fourth mixer which mixes the signal to be demodulated with the sine signal from the space-frequency synthesizer means,
   g. a first integrator and dumper which integrates and dumps the output of the first mixer,
   h. a second integrator and dumper which integrates and dumps the output of the second mixer,
   i. a third integrator and dumper which integrates and dumps the output of the third mixer,
   j. a fourth integrator and dumper which integrates and dumps the output of the fourth mixer,
   k. a first analog to digital converter which converts the analog output of the first integrator and dumper into digital data,
   l. a second analog to digital converter which converts the analog output of the second integrator and dumper into digital data,
   m. a third analog to digital converter which converts the analog output of the third integrator and dumper into digital data,
   n. a fourth analog to digital converter which converts the analog output of the fourth integrator and dumper into digital data, and
   o. an arithmetic processor for correlating each of the code words within the set of code words with combinations of the outputs of the first, second, third and fourth analog to digital converters and selecting the largest of the correlations, said processor having as its output the demodulated signal representing the code words which produced the largest correlation.

2. The system of claim 1 wherein the set of code words is a set of orthogonal code words.

3. The system of claim 1 wherein the set of code words is a set of biorthogonal code words.

4. The system of claim 2 wherein the correlation by the arithmetic processor of each of the possible code words with combinations of the outputs of the first, second, third and fourth analog to digital converters comprises:
   a. for periods of time during which the demodulated signal, which was demodulated $\delta$ periods previously, is likely to have been demodulated correctly, the correlation of each of the code words with the sum of the product of the output of the first analog to digital converter with the code word received $\delta$ periods previously, and the correlation of each of the code words with the sum of the product of the output of the second analog to digital converter with the code word received $\delta$ periods previously and the product of the output of the third analog to digital converter with the complement of the code word received $\delta$ periods previously, and
   b. for periods of time during which the demodulated signal, which was demodulated $\delta$ periods previously, is not likely to have been demodulated correctly, the correlation of each of the code words with the sum of the outputs of the first and fourth analog to digital converters and the correlation of each of the code words with the sum of the outputs of the second and third analog to digital converters.

* * * * *